(12) United States Patent
Manlove et al.

(10) Patent No.: US 6,674,279 B2
(45) Date of Patent: Jan. 6, 2004

(54) VARIABLE ATTENUATION CIRCUIT FOR A DIFFERENTIAL VARIABLE RELUCTANCE SENSOR WITH ENHANCED INITIAL THRESHOLD ACCURACY

(75) Inventors: Gregory J. Manlove, Kokomo, IN (US); Kevin M. Gertiser, Noblesville, IN (US); James C. Bach, Carmel, IN (US); Gerald A Kilgour, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 51 days.

(21) Appl. No.: 10/142,095

(22) Filed: May 9, 2002

(65) Prior Publication Data

US 2003/0210035 A1 Nov. 13, 2003

(51) Int. Cl.[7] .............................. G01P 3/48; G01B 7/30
(52) U.S. Cl. ................... 324/166; 324/173; 324/207.12
(58) Field of Search ................................. 324/166, 173, 324/174, 224, 225, 207.12; 327/184, 308; 361/236

(56) References Cited

U.S. PATENT DOCUMENTS

| | | | | |
|---|---|---|---|---|
| 3,819,004 A | * | 6/1974 | Adde ........................ | 180/197 |
| 3,832,635 A | * | 8/1974 | Cass ........................ | 324/166 |
| 5,144,233 A | | 9/1992 | Christenson et al. ........ | 324/207 |
| 5,446,375 A | * | 8/1995 | Perkins ........................ | 324/163 |
| 5,450,008 A | | 9/1995 | Good et al. .................. | 324/166 |
| 5,459,398 A | * | 10/1995 | Hansen et al. .............. | 324/166 |
| 5,477,142 A | | 12/1995 | Good et al. .................. | 324/166 |
| 5,493,214 A | * | 2/1996 | Good et al. .................. | 324/173 |
| 5,510,706 A | | 4/1996 | Good .......................... | 324/166 |
| 5,554,948 A | * | 9/1996 | Hansen et al. .............. | 327/181 |
| 5,861,744 A | * | 1/1999 | Earl ............................ | 324/166 |
| 6,040,692 A | | 3/2000 | Manlove et al. ............. | 324/173 |
| 6,133,728 A | * | 10/2000 | Manlove et al. ............. | 324/166 |
| 6,147,486 A | * | 11/2000 | Koss et al. .................. | 324/166 |
| 6,211,670 B1 | * | 4/2001 | DeWilde et al. ........ | 324/207.21 |
| 6,229,375 B1 | * | 5/2001 | Koen .......................... | 327/351 |

* cited by examiner

Primary Examiner—N. Le
Assistant Examiner—Darrell Kinder
(74) Attorney, Agent, or Firm—Stefan V. Chmielewski

(57) ABSTRACT

A variable reluctance sensor interface module having a variable attenuation circuit and a rectifier and differential to single-ended conversion circuit for operating in a current mode to attenuate a differential input voltage. The variable attenuation circuit receives an input differential voltage from a magnetic sensor, converts the differential voltage to current, and variably attenuates the current. The rectifier and differential to single-ended conversion circuit converts the variably attenuated current to a voltage output. The input circuit includes an RC filter that attenuates high frequency signals. An initial threshold circuit generates an initial threshold voltage that compensates for internal resistance variations.

12 Claims, 8 Drawing Sheets

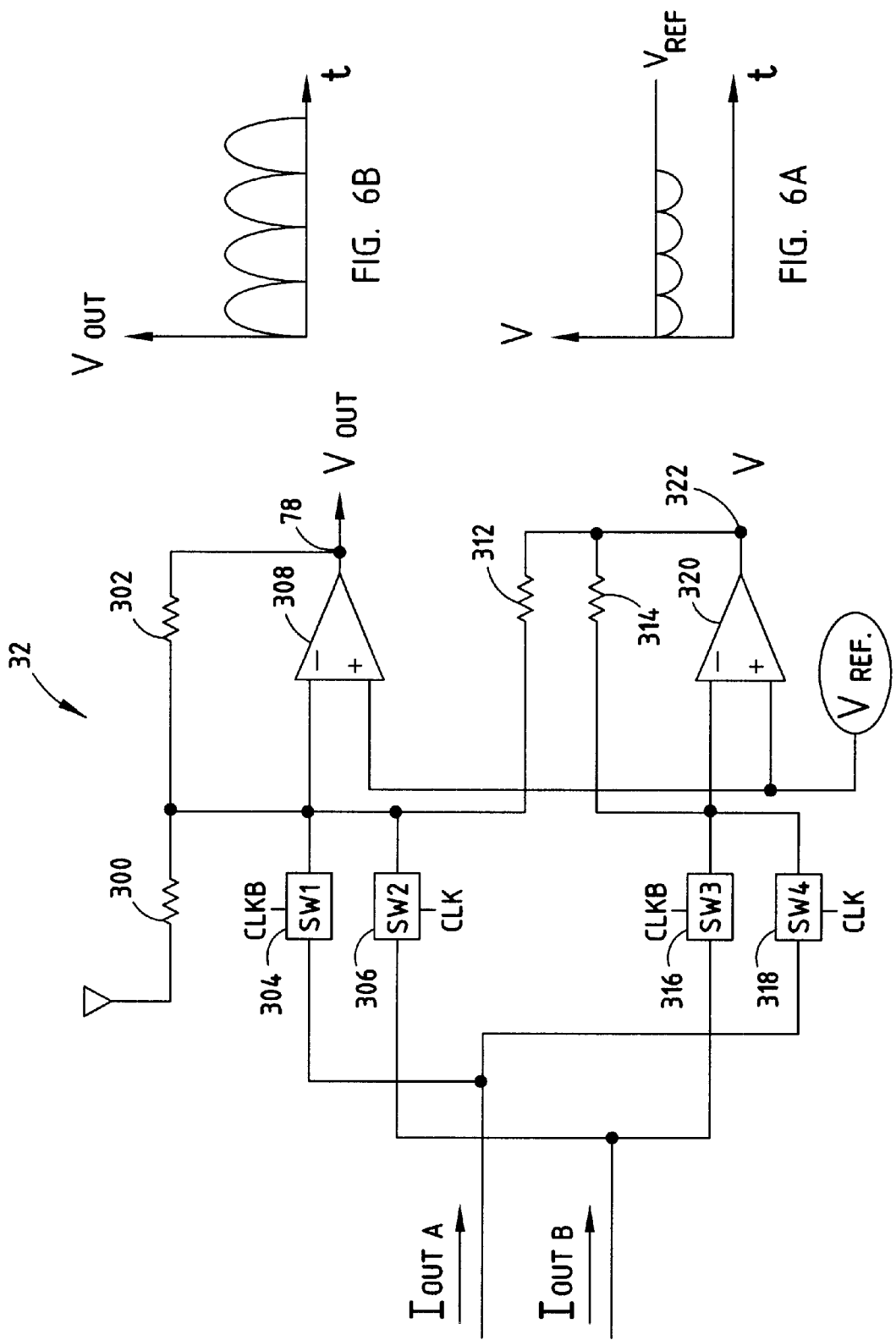

VARIABLE ATTENUATION CIRCUIT FOR A DIFFERENTIAL VARIABLE RELUCTANCE SENSOR WITH ENHANCED INITIAL THRESHOLD ACCURACY

TECHNICAL FIELD

The present invention relates generally to an adaptive attenuation circuit and, more particularly, to an adaptive attenuation circuit for adaptively attenuating an alternating differential voltage produced by a magnetic or variable reluctance sensor in response to rotation of a wheel, while maintaining noise immunity.

BACKGROUND OF THE INVENTION

Inductive magnetic sensors are commonly employed for automotive applications and the like to provide timing signals which enable the determination of position and speed of a rotating wheel. For example, specific applications may include the determination of engine crankshaft position and speed (i.e., RPM) and the determination of wheel speed for anti-lock braking systems. Inductive magnetic sensors generally used for these types of applications are commonly referred to as variable reluctance sensors.

The variable reluctance sensor is generally located adjacent to a rotating wheel which typically has a plurality of circumferentially spaced slots formed therein. The sensor has an inductive magnetic pickup that is generally made-up of a pickup coil wound on a permanent magnetic core. As the wheel rotates relative to the pickup coil, an alternating voltage is generated in the pickup coil when the slots on the wheel travel past the sensor. The alternating voltage must then be correctly decoded to recognize high or positive voltage levels. The frequency of the alternating voltage is then determined to achieve rotational speed information about the wheel.

The alternating voltage that is produced with the variable reluctance sensor has peak voltages that generally vary in amplitude according to the rotational speed of the wheel. In a number of automotive applications, the amplitude of the peak voltage may vary from approximately 250 millivolts (mV) at low end speeds to over 250 volts (V) at higher rotating speeds. However, the sensor output is usually fed to a processing module or other control device that is designed to operate within a more limited voltage range. For instance, automotive processing modules are commonly designed with 5 volts CMOS transistors in order to accommodate size and power constraints. For a 5-volt processing module, the input signal may not exceed 5 volts in order to protect the circuitry. Therefore, in order to accommodate a 0 to 5 volt range, the sensor output voltage must be properly attenuated when necessary.

In the past, one problem that has remained with some approaches has involved the inability to achieve a limited input voltage without sacrificing noise immunity and accuracy. For example, one approach to limiting the voltage suggests clipping the sensor output voltage at the rails (i.e., ground and 5 volts) and then using the clipped voltage to obtain the frequency information. However, this voltage clipping approach is very susceptible to noise interference, especially at higher speeds where the noise of the signal can approach the 5 volt limit.

Another approach for attenuating the output voltage of a variable reluctance sensor is discussed in U.S. Pat. No. 5,144,233 issued to Christenson et al. and entitled "Crankshaft Angular Position Voltage Developing Apparatus Having Adaptive Control and Diode Control." This approach uses a resistive divider network which is controlled by the forward voltage of a diode. The above-referenced approach has the variable reluctance sensor connected in a single-ended configuration with one end of the pickup coil connected to ground. In addition, the circuit is capable of swinging to the level of the battery. This single-ended approach operates such that when the input voltage becomes high enough in amplitude to forward bias the diode, a resistive path is established to create a resistor divider network that attenuates the input voltage. However, this approach does not teach the attenuation of a differential voltage, and may not provide sufficient attenuation control that is necessary to protect the 5-volt gates associated with the processing module.

Another approach uses an RC network to attenuate the input voltage. While conventional RC filtering approaches have provided suitable attenuation for low voltage attenuation, high voltage attenuation applications such as those associated with Direct Ignition System (DIS) have exhibited limited attenuation capability. That is, it is generally difficult to provide substantial voltage attenuation for high voltages and also more difficult to control the attenuation. In addition, conventional usage of the RC filter introduces the propensity of a phase shift between the inputs for a differential voltage, thereby potentially causing significant errors in zero-crossing position determination.

One approach that uses variable resistance to attenuate the input voltage is disclosed in U.S. Pat. No. 5,450,008, entitled "Adaptive Loading Circuit for a Differential Input Magnetic Wheel Speed Sensor," issued to Good et al., and also disclosed in U.S. Pat. No. 5,510,706, entitled "Differential to Single-Ended Conversion Circuit for a Magnetic Wheel Speed Sensor," issued to Good, and U.S. Pat. No. 5,477,142, entitled "Variable Reluctance Sensor Interface Using a Differential Input and Digital Adaptive Control," issued to Good et al. The aforementioned U.S. patents are hereby incorporated by reference. The approach disclosed in U.S. Pat. Nos. 5,450,008, 5,510,706, and 5,477,142 discuss an adaptive loading circuit that provides variable attenuation by switching binary weighted resistors between input nodes. Included in this approach are multiple resistors and switch pairs which provide voltage attenuation. This approach differentially attenuates the voltage input and is capable of providing sufficient attenuation on high input amplitudes for a 5-volt interface circuit. However, a minimum of three resistors are required for each of the differential inputs. In addition, the switch that is employed is designed to be large so that impedance of the voltage divider is dominated by the resistor, which makes for a large area. Further, the input resistance must vary from one (1) to sixty-four (64) as the switch area varies from sixty-four (64) to one (1). This range of values can make it difficult to match various attenuation stages and also adds to increased circuit area.

A more recent approach to providing variable attenuation for a differential variable reluctance sensor has a current mode as disclosed in U.S. Pat. No. 6,040,692, entitled "Variable Attenuation Circuit for a Differential Variable Reluctance Sensor Using Current Mode," which is hereby incorporated by reference. According to the aforementioned approach, a variable attenuation circuit and a rectifier and differential to single-ended conversion circuit operate in a current mode to attenuate a differential input voltage. The variable attenuation circuit receives an input differential voltage from a magnetic sensor and converts the differential voltage to current. Current sourcing circuits provide variable current attenuation by switching in and out transistor-based current sourcing branches. The rectifier and differential to single-ended conversion circuit converts the variable attenuated currents to a voltage output. The output of the rectifier circuit is applied to an adaptive threshold circuit. Unlike some prior approaches, the circuit maintains constant input impedance even when attenuation is applied.

The current mode attenuation approach disclosed in U.S. Pat. No. 6,040,692 offers a number of advantages over previous approaches including the presence of a constant input impedance. However, because the input voltage signal has been converted to a current signal and then is subsequently processed as a voltage signal, there may be an error in the absolute amplitude of the rectified voltage signal which is a function of temperature of the resistors on the application specific integrated circuit (ASIC). As the ASIC resistors increase in temperature, the amplitude of the amplified signal correspondingly increases which directly affects the low amplitude voltage that is detected by the circuit. Because the integrated resistors may vary due to process and temperature variations, the low amplitude detection circuit can vary by as much as plus or minus thirty-three percent (±33%) from the desired level.

Accordingly, it is therefore desirable to provide for enhanced adaptive attenuation of an alternating differential voltage generated by a magnetic sensor in response to the rotation of a wheel. It is further desirable to provide for an accurate transmission speed sensor interface that is compatible with various sensors and provides an optimized signal-to-noise ratio in the system, without requiring different input configurations. Further, it is desirable to provide for an attenuation circuit that is compatible with input filtering regardless of the circuit attenuation and that provides a detection circuit with enhanced accuracy to ensure that noise associated with low amplitude input signals is removed.

SUMMARY OF THE INVENTION

In accordance with the teachings of the present invention, a variable attenuation circuit is provided for adaptively attenuating an alternating differential voltage that is produced by a magnetic sensor in response to rotation of a wheel. According to one aspect of the invention, the attenuation circuit includes an input circuit for receiving an input alternating differential voltage from a magnetic sensor via first and second input lines. The input circuit includes an RC filter coupled to the first and second input lines for attenuating high frequency signals. The attenuation circuit also includes a voltage to current converter circuit for converting the input alternating differential voltage to a differential current signal. The voltage to current converter circuit has an input coupled to the input current, and the input has a constant input impedance. The attenuation circuit further includes variable attenuation circuitry for selectively attenuating the differential current signal, a current to voltage conversion circuit for converting the attenuated differential current to a voltage signal, and an output for providing the output voltage within a preferred voltage range.

According to another aspect of the invention, the attenuation circuit includes an input circuit for receiving an input alternating differential voltage from a magnetic sensor via first and second input lines, a voltage to current converter circuit for converting the input alternating differential voltage to a differential current signal, variable attenuation circuitry for selectively attenuating the differential current signal, and a current to voltage converter circuit for converting the attenuated differential current to a voltage signal. The current to voltage converter circuit has an internal resistance. The attenuation circuit also includes a comparator for comparing the voltage signal to a threshold, and an initial threshold circuit for generating an initial threshold voltage for comparison by the comparator. The initial threshold circuit generates an initial threshold voltage that varies proportional to internal resistors of the current to voltage converter circuit.

These and other features, objects, and benefits of the invention will be recognized by those who practice the invention and by those skilled in the art, from reading the following specification and claims, together with reference to the accompanying drawings.

BRIEF DESCRIPTION OF THE DRAWINGS

The present invention will now be described, by way of example, with reference to the accompanying drawings, in which:

FIG. 5 is a circuit diagram illustrating the current mode rectifier and differential to single-ended conversion circuit of the interface module according to the present invention;

FIGS. 6A and 6B are graphs illustrating voltage provided by the current mode rectifier and differential to the single-ended conversion circuit of FIG. 5;

DESCRIPTION OF THE PREFERRED EMBODIMENTS

Figure 1:
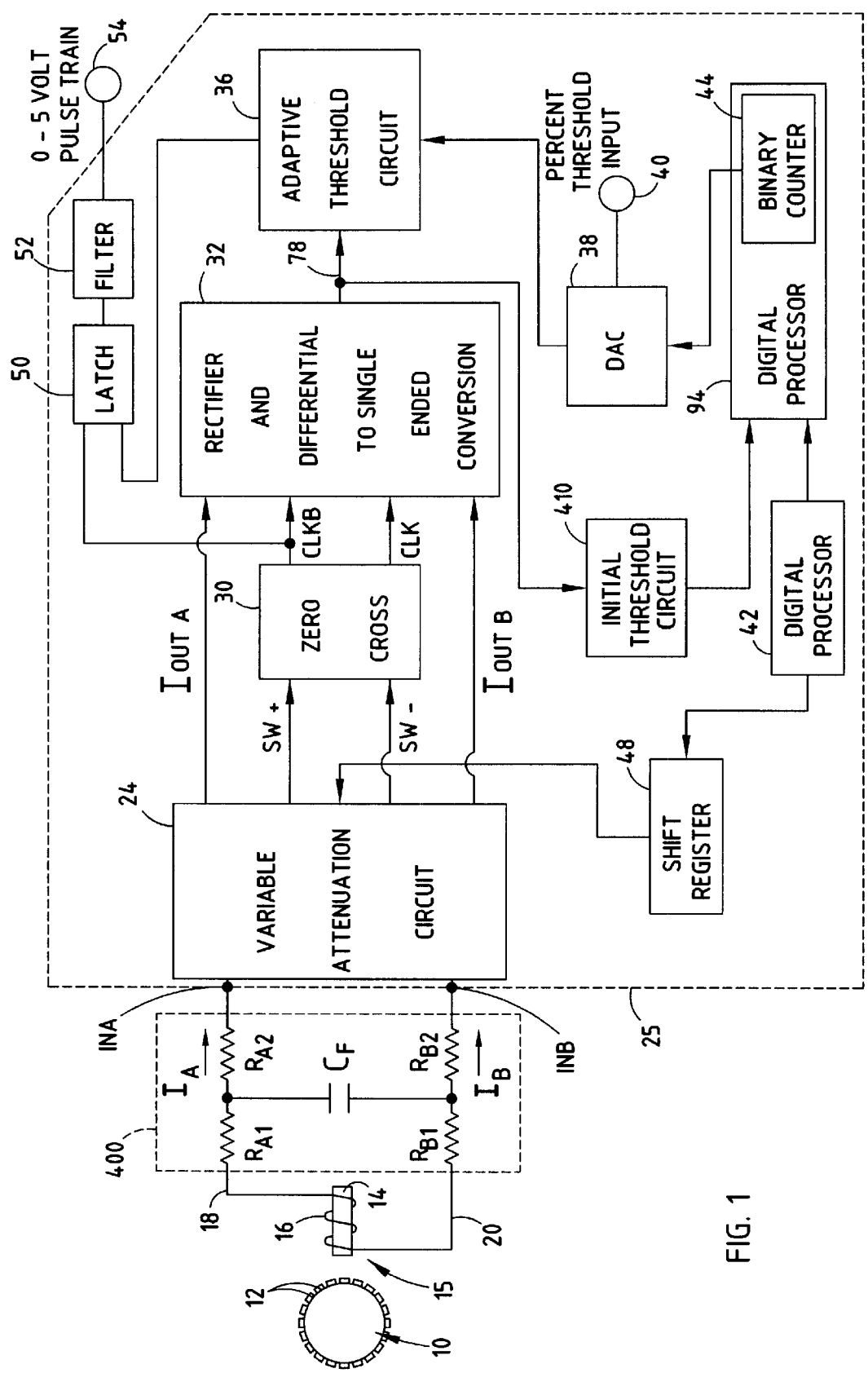
FIG. 1 is a schematic diagram illustrating a variable reluctance sensor interface module and RC filter input circuit for interfacing a variable reluctance sensor with a processing module.
Figure 2:
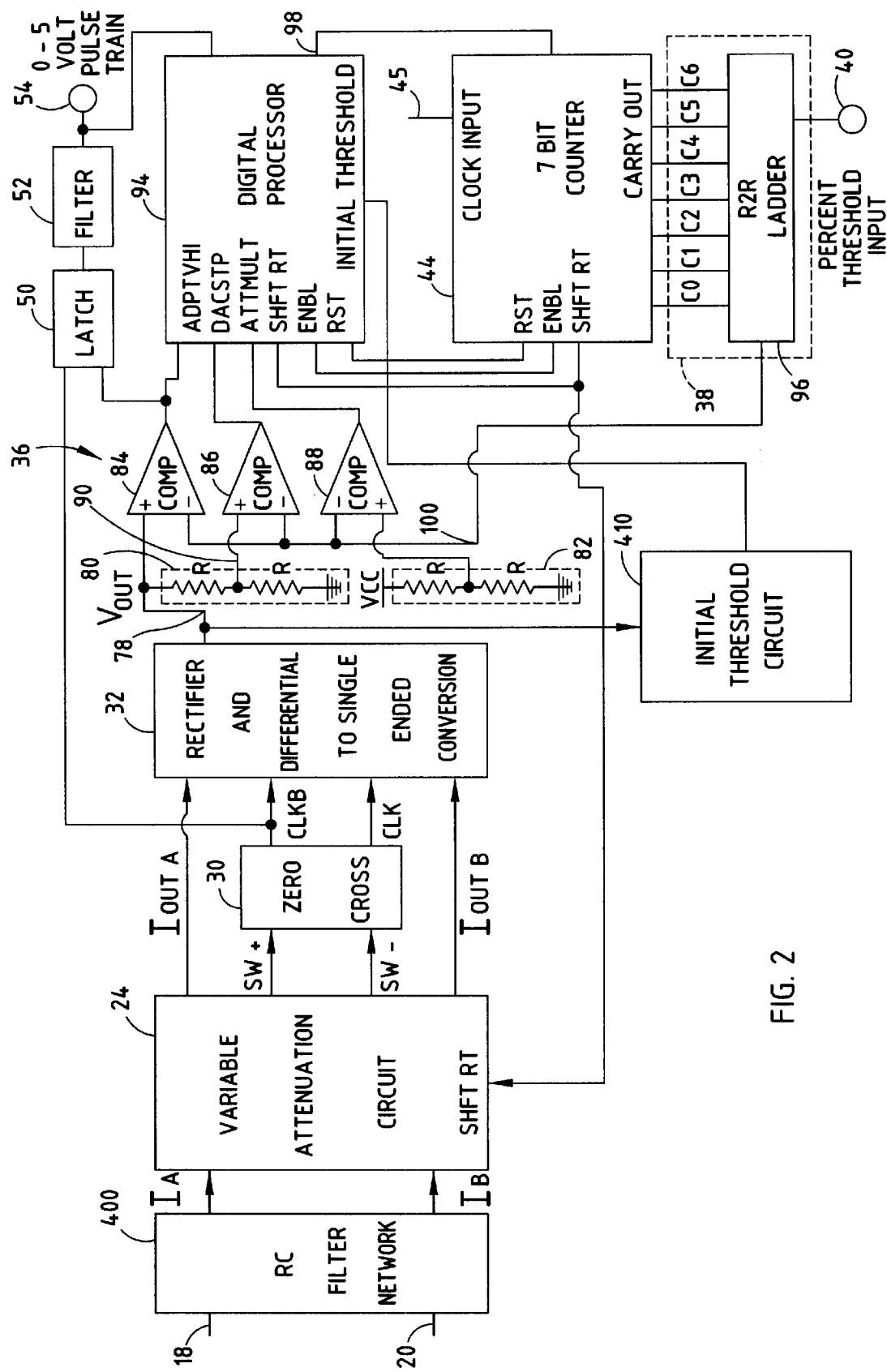
FIG. 2 is a schematic diagram further illustrating the variable reluctance sensor interface module as shown in FIG. 1.

Referring now to FIGS. 1 and 2, a variable reluctance sensor interface module 25 is shown therein for interfacing a variable reluctance sensor 15 with a processing module (not shown). The variable reluctance sensor interface module 25 is adapted to be used in a vehicle (not shown), such as an automobile. More particularly, this invention will be described for use in sensing rotational wheel speed for systems such as anti-lock braking systems. However, it is to be understood that the use of this invention is not restricted to automobiles and anti-lock braking systems, but could have other uses such as determining engine crankshaft position and speed for a distributorless ignition system (DIS).

With particular reference to FIG. 1, a rotatable wheel 10 is shown which may be driven in conjunction with a wheel/tire assembly found on a vehicle, such as an automobile. The wheel 10 has a plurality of slots 12 that are preferably evenly spaced from each other about the outer periphery of the wheel 10. In a distributorless ignition system (DIS) application for a spark ignited internal combustion engine, an additional slot may be employed for purposes of synchronizing the distributorless ignition system in a manner known to those skilled in the art.

A variable reluctance magnetic pickup or magnetic sensor 15 is disposed adjacent to the outer periphery of wheel 10. The magnetic sensor 15 includes a magnetic pickup made-up of a permanent magnet 14 which has a core formed of magnetic material and a pickup coil 16 that is wound on the permanent magnet 14. The magnetic sensor 15 has a first sensor output line 18 connected to one side of pickup coil 16 and a second sensor output line 20 connected to the other side of pickup coil 16.

As the plurality of slots 12 on wheel 10 rotate past the end of magnetic sensor 15, an alternating differential voltage is induced or generated on the pickup coil 16. The differential voltage waveform generated on pickup coil 16 is transmitted onto first and second sensor output lines 18 and 20 as a series of two alternating voltages which are one hundred eighty degrees (180°) out of phase relative to one another. Each cycle of the alternating voltage represents the passage of one of slots 12 past the end of the magnetic sensor 15. Accordingly, each voltage cycle occurs at predetermined angularly spaced positions as found on wheel 10. In effect, the peak-to-peak voltage potential existing between sensor output lines 18 and 20 represents the amplitude of peak-to-peak voltage created by the changing or varying reluctance of the magnetic field produced by magnetic sensor 15.

Connected between the magnetic sensor 15 and the variable reluctance sensor interface module 25 is an input circuit having an RC filter network 400 which includes a first pair of load resistors $R_{A1}$ and $RA_2$ connected to the first sensor output line 18 and a second pair of load resistors $R_{B1}$ and $R_{B2}$ connected to the second sensor output line 20. The RC filter network 400 further includes a capacitor CF coupled between lines 18 and 20. The RC filter network 400 provides a first order filter which prefilters and attenuates large magnitude signals to thereby effectively increase the dynamic range of the interface module 25, such that a wider variety of sensors may be employed having different sensitivities. Because the sensor interface module 25 has a substantially constant input impedance, the RC filter network 400 can be added regardless of the amount of attenuation applied. The prefiltering achieved with the RC filter network 400 allows for a frequency dependent attenuation curve. The RC filter network 400 is particularly well suited for use in transmission speed systems, because there can be a large amount of high frequency noise present in such systems. According to one example, resistors $R_{A1}$ and $RA_2$ and resistors $R_{B1}$ and $RB_2$ may each have a value of 25 k, and capacitors $C_F$ may have a value of 1,000 pF. The differential voltage produced by the variable reluctance sensor 15 generates positive current $I_A$ across resistor $R_{A2}$ and negative current $I_B$ across resistor $R_{B2}$.

The variable reluctance sensor interface module 25 has a pair of input pads INA and INB connected to first and second sensor output lines 18 and 20 via the RC filter network 400, for receiving the differential input voltage. The interface module 25 receives the differential input voltage and currents $I_A$ and $I_B$ at input pads (e.g., terminals) INA and INB. The interface module 25 in turn processes the received differential voltage and currents $I_A$ and $I_B$ and produces a 0 to 5 volt digital pulse train at output 54 for use by a processing module (not shown) to achieve rotational speed information about the wheel 10.

Generally speaking, the interface module 25 includes a variable attenuation circuit 24, a zero-crossing detector 30, a rectifier and differential to single-ended conversion circuit 32, an adaptive threshold circuit 36, and an associated digital-to-analog converter (DAC) 38. The variable attenuation circuit 24 receives currents $I_A$ and $I_B$ from lines 18 and 20, respectively, and provides signal attenuation in a current mode. Variable attenuation circuit 24 provides attenuated current outputs $I_{OUT\_A}$ and $I_{OUT\_B}$ to the rectifier and differential to single-ended conversion circuit 32 as well as signals SWU+ and SW− to a zero-crossing detector 30. The signals SW+ and SW− provide polarity information about the input. The zero-crossing detector 30 in turn indicates whether the input is currently positive or negative. The rectifier and differential to single-ended conversion circuit 32 rectifies the differential input and provides a single-ended voltage output on line 78, which is input to the adaptive threshold circuit 36.

The variable reluctance sensor interface module 25 further includes an initial threshold circuit 410 in communication with the digital processor 94 and receiving the rectified voltage $V_{OUT}$ output from rectifier and differential to single-ended conversion circuit 32. The initial threshold circuit 410 generates an initial threshold voltage for comparison by comparators in the adaptive threshold circuit 36. The initial threshold voltage is applied as the comparator threshold during a low amplitude signal to compensate for variations in circuit gain due to changes in internal resistors due to processing and temperature variations.

With particular reference to FIG. 2, the adaptive threshold circuit 36 includes first, second, and third voltage comparators 84, 86, and 88. The first voltage comparator 84 has a positive (+) input connected to the output of the conversion circuit 32 for receiving the single-ended voltage output 78. In addition, voltage comparator 84 has the negative (−) input connected to an analog output of the DAC 38 for receiving an analog threshold voltage. The second comparator 86 has a positive (+) input connected to the output of conversion circuit 32 via a resistor divider network 80 which has a plurality of resistors R coupled to a programmable control multiplexer (not shown). Resistor divider network 80 divides the single-ended voltage into a selected percent thereof which may be chosen by a user and loaded into the control multiplexer. The negative (−) input of voltage comparator 86 is also connected to the analog output of the DAC 38. The third voltage comparator 88 has a positive (+) input connected to voltage supply VCC via a resistor divider network 82. The negative (−) input of voltage comparator 88 is likewise connected to the analog output of the DAC 38.

Voltage comparators 84, 86, and 88 each have an output that is connected to the inputs of the second digital processor 94. More specifically, the output of comparator 84 is fed to an ADPTVHI input of processor 94 and is also fed to one input of a latch 50. The output of comparator 86 is fed to a DACSTP input of processor 94, while the output of comparator 88 is input to an ATTMULT input of processor 94. Digital processor 94 has a shift right (SHFT RT) output connected to a SHFT RT input of a 7-bit binary pulse counter 44 as well as the SHFT RT input to variable attenuation circuit 24. Digital processor 94 further includes enable (ENBL) and reset (RST) outputs connected to corresponding ENBL and RST inputs of counter 44 for controlling operation of binary counter 44.

The 7-bit binary pulse counter 44 performs a successive binary counting operation in response to signals provided to the enable (ENBL) and reset (RST) inputs thereof. In doing so, pulse counter 44 further has a clock input 45 that is connected to a source of constant frequency pulses which control the count rate. Counter 44 also includes seven output lines connected to DAC 38 for supplying the DAC 38 with seven count bits CO through C6 which contain the count magnitude. In addition, DAC 38 receives a preset threshold input via line 40 for enabling a user to select the percent threshold with which to compare the single-ended voltage 78 via comparators 84, 86, and 88. It should be appreciated that the initial threshold value determined by the initial threshold circuit 410 is initially used when the sensor signal is initially applied and no attenuation is provided.

The reset latch 50 has one input connected to the output of the first voltage comparator 84 and a second input connected to the output of the zero-crossing voltage comparator 30 at line CLKB. Latch 50 detects positive or rising voltage swings generated by voltage comparator 84, and generates a rising voltage pulse 55 in response thereto. Latch 50 further detects voltage crossings between the differential voltage across input pads INA and INB as detected by zero-crossing detector 30 and produces falling edges in response thereto. Latch 50 also has an output coupled to a filter 52 which provides a filter delay time in order to filter out unwanted noise. Accordingly, an output 54 is provided via filter 52 which is in the form of a digital 0 to 5 volt pulse train.

It should be appreciated that the adaptive threshold circuit 36 and associated DAC 38 as well as latch 50, filter 52, shift register 48, and digital signal processors 42 and 94 provide substantially the same operation as is disclosed in issued U.S. Pat. Nos. 5,450,008, 5,510,706, and 5,477,142 which are incorporated herein by reference. The current mode variable attenuation circuit 24 as well as the rectifier and differential to single-ended conversion circuit 32, the adaptive threshold circuit 36, initial threshold circuit 410, and associated hardware and processing techniques are discussed in detail as follows.

Variable Attenuation Circuit

The variable attenuation circuit 24 provides adaptive attenuation of an alternating differential voltage that is produced by a magnetic sensor in response to rotation of a wheel by detecting and processing the signal in a current mode. By detecting and processing the input signal as a current signal rather than a voltage, a more optimal solution may be realized. The current mode also allows for a reduction in the external circuitry that would otherwise be required, with minimal errors, while realizing maximum noise immunity.

Figure 3:
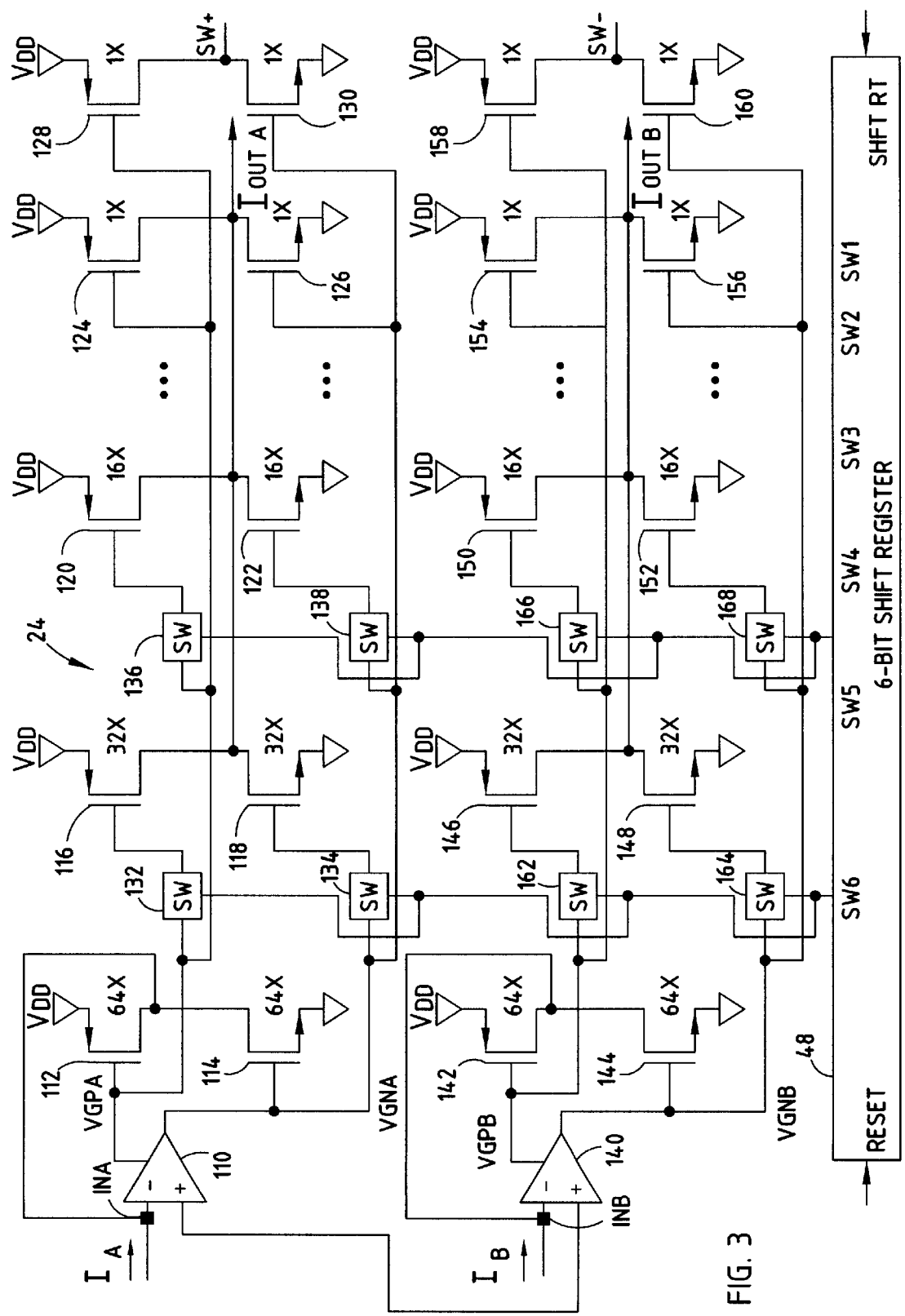
FIG. 3 is a circuit diagram illustrating the current mode variable attenuation circuit of the interface module according to the present invention.

Referring to FIG. 3, the variable attenuation circuit 24 is shown conceptually for use for a differential input magnetic wheel speed sensor 15 by processing input currents $I_A$ and $I_B$ using a current mode and producing output current signals $I_{OUT\,A}$ and $I_{OUT\,B}$. The variable reluctance sensor 15 output is depicted as a differential voltage source. This voltage source is converted to positive and negative currents $I_A$ and $I_B$. externally through resistors $R_A$ and $R_B$, respectively. The variable attenuation circuit 24 includes a first current sourcing circuit coupled to input pad INA for sourcing current to maintain a fixed voltage at input pad INA. The variable attenuation circuit 24 also includes a second current sourcing circuit coupled to input pad INB for sourcing current to maintain a fixed voltage at the input pad INB. Each of the first and second current sourcing circuits includes an amplifier and a plurality of current sourcing branches, which are selectively switched in and out with switching circuitry to provide selectable amounts of current branching as needed to maintain a differential output current that realizes an output voltage on line 54 within a workable range. According to the embodiment shown, each of the plurality of current sourcing branches are binary weighted, however, it should be appreciated that other weighting variations may be employed.

The first current sourcing circuit has a first amplifier 110 configured as a differential stage amplifier, while the second current sourcing circuit has a second amplifier 140 configured as a differential stage amplifier. The first amplifier 110 has a negative (−) input coupled to positive (+) input pad INA for receiving positive (+) input current $I_A$. The positive (+) input of amplifier 110 is coupled to the positive (+) input of the second amplifier 140 and is referenced to mid supply ($V_{DD}/2$), which is approximately 2.5 volts according to one example. The first amplifier 110 produces two output voltages identified as voltages VGPA and VGNA. Voltage VPGA is a voltage applied to the gate of a 64× P-channel transistor 112 which has its source coupled to rail voltage $V_{DD}$. Voltage VGNA is a gate voltage applied to the gate of a 64× N-channel transistor 114 which has its source coupled to ground. The drain terminals of transistor 112 and transistor 114 are tied together and further coupled to input pad INA. Together, transistors 112 and 114 make up the output stage of amplifier 110. Input pad INA is maintained at 2.5 volts through negative feedback of the first amplifier 110 and the 64× P-channel and N-channel transistors 112 and 114, respectively.

The output current sourced by the 64× transistors 112 and 114 is equal to the input current $I_A$ to compensate for the external input current $I_A$ provided by the sensor 15 and external resistor $R_A$. Voltages VGPA and VGNA are established with amplifier 110, through feedback, to provide the desired output current. The two gate voltages VGPA and VGNA are either connected to the gates of the various selected pairs of current sourcing transistors or the respective P-channel transistor gates are connected to rail voltage $V_{DD}$ and the N-channel transistor gates are grounded. At all times, it is preferred that a 1× transistor pair is always connected.

The first current sourcing circuit further includes a plurality of pairs of P-channel and N-channel transistors connected as current sourcing branches which may be switched in or out to add to the final output current $I_{OUT\,A}$. The pairs of P-channel and N-channel transistor current sourcing branches are preferably binary weighted to sequentially add to or reduce the total current $I_{OUT\,A}$ as a multiplication factor of two. Included are 32×, 16×, 8×, 4×, 2×, and 1× current sourcing branches. The 32× current sourcing branch has a 32× P-channel transistor 116 with its source tied to rail voltage $V_{DD}$, and a 32× N-channel transistor 118 with its source tied to ground. The drain terminals of transistor 116 and transistor 118 are tied together and further coupled to the output for providing a current contribution to output current $I_{OUT\,A}$ The 32× transistor pair made-up of transistors 116 and 118 is controlled by switching circuitry including switches 132 and 134, respectively, which apply gate voltage VGPA to the gate of transistor 116 and gate voltage VGNA to the gate of transistor 118 when switch control signal SW6 is activated.

The first current sourcing circuit likewise includes a 16× current sourcing branch made-up of a 16× P-channel transistor 120 with its source coupled to rail voltage $V_{DD}$ and a 16× N-channel transistor 122 having its source tied to ground. The drain terminals of transistor 120 and transistor 122 are tied together and further coupled to the output for providing a current contribution to output current $I_{OUT\,A}$. Switches 136 and 138 are responsive to switch control signal SW5 to control the application of gate voltage VGPA to the gate of transistor 120 and gate voltage VGNA to the gate of transistor 122 so as to activate or deactivate the corresponding 16× current sourcing branch. In addition, the first current sourcing circuit includes current sourcing branches made-up of pairs of P-channel and N-channel transistors having a size of 8×, 4×, and 2× transistors, each of which are switched in by respective switch control signals SW4, SW3, and SW2. Further shown is a 1× current sourcing branch made-up of a 1× P-channel transistor 124 having the source tied to rail voltage $V_{DD}$ and a 1× N-channel transistor 126 having the source tied to ground. The 1× current sourcing branch is always activated and therefore always provides a current contribution to output current $I_{OUT\,A}$.

Further, the first current sourcing circuit includes a second pair of 1× transistors, including 1× P-channel transistor 128 having the source tied to rail voltage $V_{DD}$ and a 1× N-channel transistor 130 having the source tied to ground. The drain terminals of transistor 128 and transistor 130 are tied together to provide the input polarity signal SW+. Signal SW+ provides polarity information about the input signal. Signal SW+ is positive when input current $I_A$ is positive.

The second current sourcing circuit processes the negative current signal $I_B$ and is configured similar to the first current sourcing circuit described above. Included is the second amplifier 140 which has a negative (−) input coupled to input pad INA for receiving input current $I_B$. The positive (+) input of amplifier 140 is coupled to the positive (+) input of the first amplifier 110 and referenced to mid supply ($V_{DD}/2$) which is approximately 2.5 volts. The second amplifier 140 produces two output voltages identified as voltages VGPB and VGNB. Voltage VGPB is a voltage is applied to the gate of a 64× P-channel transistor 142 which has its source coupled to rail voltage $V_{DD}$. The voltage VGNB is a voltage applied to the gate of a 64× N-channel transistor 144, which has its source coupled to ground. The drain terminals of transistor 142 and transistor 144 are tied together and further coupled to input pad INB. Together, transistors 142 and 144 make up the output stage of amplifier 140. Input pad INB is maintained at 2.5 volts through negative feedback of the amplifier 140 and the 64× P-channel and N-channel transistors 142 and 144, respectively.

The output current sourced by the 64× transistors 142 and 144 is equal to the input current $I_B$ to compensate for the external input current $I_B$ provided by the sensor 15 and external resistor $R_B$. Voltages VGPB and VGNB are established with amplifier 140, through feedback, to provide the desired output current. The two gate voltages VGPB and VGNB are either connected to the gates of the various selected pairs of current sourcing transistors or the respective P-channel transistor gates are connected to rail voltage $V_{DD}$ and the N-channel transistor gates are grounded. At all times, it is preferred that a 1× transistor pair is always connected.

The second current sourcing circuit further includes a plurality of pairs of P-channel and N-channel transistors connected as current sourcing branches which may be switched in or out to add to the final output current $I_{OUT\,B}$. The pairs of P-channel and N-channel transistor current sourcing branches are preferably binary weighted to sequentially add to or reduce the current as a multiplication factor of two. Included are 32×, 16×, 8×, 4×, 2×, and 1× current sourcing branches. The current 32× sourcing branch has a 32× P-channel transistor 146 with the source tied to rail voltage $V_{DD}$ and a 32× N-channel transistor 148 with the source tied to ground. The drain terminals of transistor 146 and transistor 148 are tied together and further coupled to the output for providing a current contribution to current $I_{OUT\,B}$. The transistor pair made-up of transistors 146 and 148 are controlled by switching circuitry including switches 162 and 164 which apply gate voltage VGPB to the gate of transistor 146 and gate voltage VGNA to the gate of transistor 148 when switch control signal SW6 is activated.

The second current sourcing circuit likewise includes a 16× current sourcing branch made-up of 16× P-channel transistor 150 with the source coupled to rail voltage $V_{DD}$ and 16× N-channel transistor 152 having the source tied to ground. The drain terminals of transistor 150 and transistor 152 are tied together and further coupled to the output for providing a current contribution to output current $I_{OUT\,B}$. Switches 166 and 168 are responsive to switch control signal SW5 to control the application of gate voltage VGPB to the gate of transistor 150 and gate voltage VGNB to the gate of transistor 152 so as to activate or deactivate the corresponding 16× current sourcing branch. In addition, the second current sourcing circuit further includes current sourcing branches made-up of pairs of P-channel and N-channel transistors having a size of 8×, 4×, and 2× transistors, each of which are switched in by respective switch control signals SW4, SW3, and SW2. Further shown is a 1× current sourcing branch made-up of a 1× P-channel transistor 154 having the source tied to rail voltage $V_{DD}$ and a 1× N-channel transistor 156 having the source tied to ground. The 1× current sourcing branch is always activated and therefore always provides a current contribution for output current $I_{OUT\,B}$.

Further, the second current sourcing circuit includes a second pair of 1× transistors, including 1× P-channel transistor 158 having the source tied to rail voltage $V_{DD}$ and 1× N-channel transistor 160 having the source tied to ground. The drain terminals of transistor 158 and transistor 160 are tied together to provide the input polarity signal SW−. Input polarity signal SW− provides polarity information about the input signal. Signal SW− is negative when output current $I_B$ is negative.

As the positive and negative current signals $I_A$ and $I_B$ are processed identically, the description hereinafter will detail the circuitry on the positive side. The output current from the 64× pair of transistors 112 and 114 is equal to the input current $I_A$ to compensate for the external input current $I_A$ provided by the sensor 15 and the RC filter network 400. The current sourcing branches include 32×, 16×, 8×, 4×, 2×, and 1× current sourcing branches, which together provide a sum total of 64× size transistors which equals the 64× size transistors 112 and 114 at the output stage of amplifier 110 to provide a one-to-one ratio when all transistors are activated. A one-to-one ratio provides no current attenuation such that the output current $I_{OUT\,A}$ is equal to the input current $I_A$. To attenuate the input current $I_A$, one or more current sourcing branches are switched out (e.g., deactivated) so as to decrease the transistor ratio of current sourcing branch transistors to the 64× output stage transistors. By switching out the 32× current sourcing branch made-up of the pair of transistors 116 and 118, a transistor ratio of 32:64 (e.g., one-half) is achieved so as to provide current attenuation by a factor of two to thereby reduce the input current $I_A$ by one-half. Similarly, to achieve further attenuation, the 16× current sourcing branch made-up of transistors 120 and 122 is switched out to provide a transistor ratio of 16:64 (e.g., one-fourth) to achieve a current attenuation factor of four to thereby reduce the input current $I_A$ by one-fourth. Current attenuation likewise continues by deactivating the current sourcing branches made-up of the 8×, 4×, and the 2× transistors in sequence so that the 1× current sourcing branch made-up of transistors 124 and 126 remains on to provide a ratio of 1:64 and therefore a current attenuation of one sixty-fourth (1/64).

Initially, it is assumed that the input signals are relatively small. Under this condition, the transistor gates are connected to gate voltages VGPA and VGNA. The 32× transistor pair has an output current equal to one-half the input current $I_A$. The 16× transistor pair has an output current equal to one-fourth the input current $I_A$. The remaining four transistor pairs are each one-half the previous value, such that all the output currents when summed are equal to $(1/2+1/4+1/8+1/16+1/32+1/64+1/64) \times I_A$ at the output terminal $I_{OUT\_A}$. This generates an output current $I_{OUT\_A}$ equal to the input current $I_A$. The output current $I_{OUT\_A}$ is converted to a voltage as will be described later hereinafter.

To attenuate the output current $I_{OUT\_A}$ by a factor of two, the 32× transistor pair is switched off. This is accomplished by tying the gate of the P-channel transistor 116 to rail voltage $V_{DD}$ and the gate of N-channel transistor 118 to ground. The current output is now equal to one-half the original value. Attenuation by an additional factor of two may be achieved by next switching the 16× pair of transistors 120 and 122 off, so that the output current $I_{OUT\_A}$ is attenuated by an additional factor of two. Successive pairs of transistors may be switched off by a factor of two in sequence. With all six controllable current sourcing branches switched off, an ultimate attenuation of 1/64 is achieved. Attenuation control is applied to the positive and negative terminals in the same manner assuring the differential input is attenuated correctly.

In order to provide for a 0 to 5 volt output range, it is generally preferred that the current attenuation occur at a selected percent, such as about eighty percent (80%) of full scale. This may be accomplished by monitoring the output voltage 78 to maintain the output voltage within a 0 to 4 volt range. Accordingly, when the peak-to-peak voltage at output 78 remains within 0 to 4 volts peak-to-peak, no current attenuation occurs. However, when the output voltage 78 exceeds 4 volts, shift register 48 initiates a shift-right to cause switch output SWG to activate switches 132 and 134 as well as switches 162 and 164 to switch out the corresponding transistors 116, 118, 146, and 148 and remove the 32× current sourcing branch. This, in effect, reduces the output current $I_{OUT\_A}$ and $I_{OUT\_B}$ and, therefore, the output voltage $V_{OUT}$ by one-half.

Figure 4A:
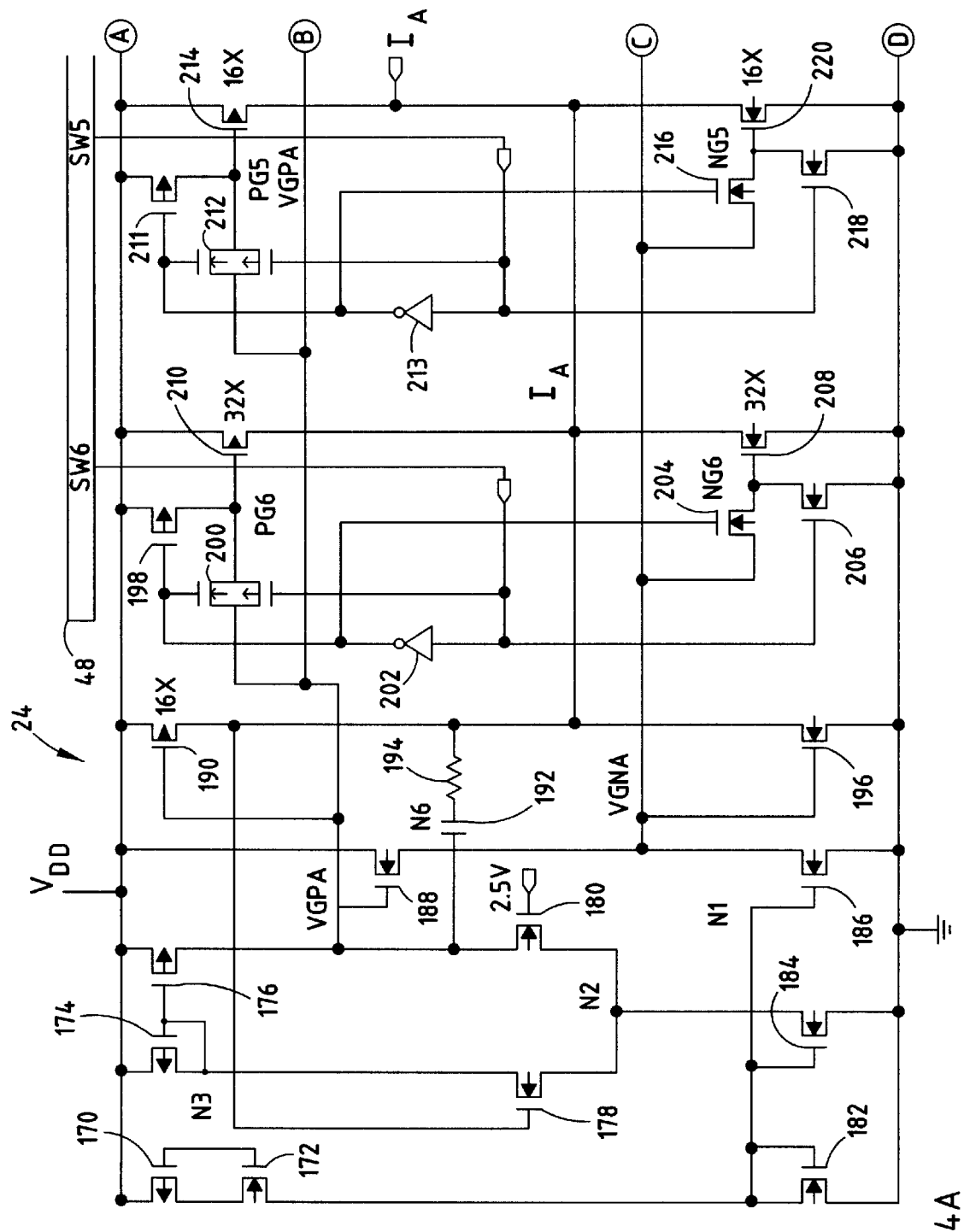
FIGS. 4A and 4B together are a circuit diagram further illustrating the variable attenuation circuit of FIG. 3.
Figure 4B:
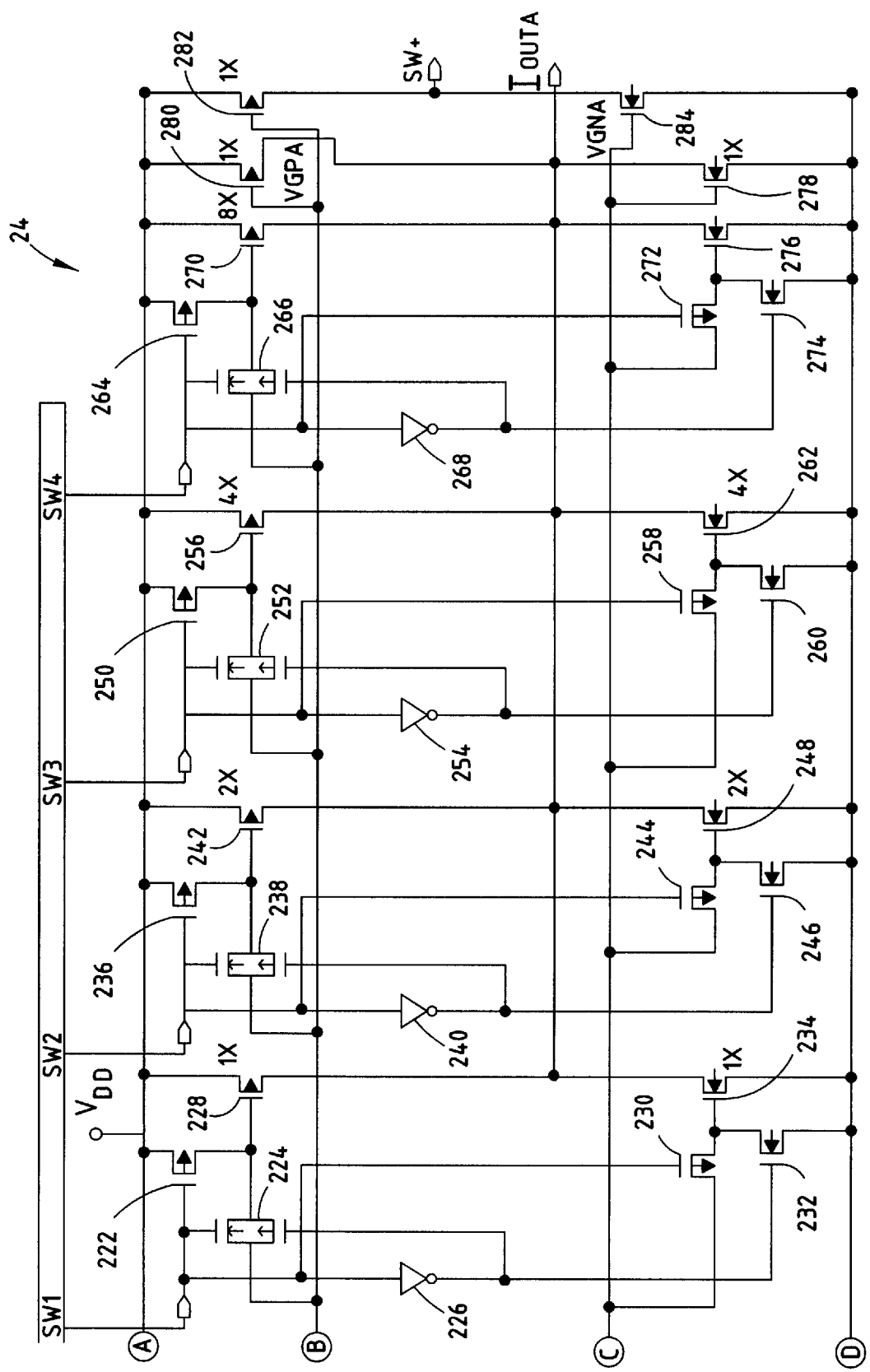

Referring particularly to FIGS. 4A and 4B, the positive side of the variable attenuation circuit 24 is shown as implemented according to another circuit arrangement. Variable attenuation circuit 24 includes P-channel transistors 170, 174, and 176; N-channel transistors 172, 178, 180, 182, 184, 186, and 188; capacitor 192; and resistor 194, which together make up the differential stage of amplifier 110. P-channel transistors 170, 174, and 176 each have the source coupled to rail voltage $V_{DD}$, with transistors 174 and 176 having the gate terminals connected together and to node N3. Transistors 178 and 180, which provide a differential stage, each have a source tied to node N2 which, in turn, is tied to the drain of transistor 184. The drain of transistor 178 is coupled to node N3, while the gate thereof is tied to input pad INA to receive input current $I_A$. The gate of transistor 180 receives a 2.5 volt input, while the drain provides the gate voltage VGPA. Transistor 172 has its gate coupled to the gate of transistor 170 and a drain tied to the drain of transistor 170. The source of transistor 172 is coupled to node N1, which is further tied to both the drain and gate of transistor 182 as well as the gates of transistors 184 and 186. The source of transistors 182, 184, and 186 are all tied to ground. In addition, transistor 188 has the gate tied to gate voltage VGPA, the drain tied to rail voltage $V_{DD}$, and the source coupled to the gate voltage VGNA. Further, the drain of transistor 186 is coupled to gate voltage VGNA. Capacitor 192 and resistor 194 provide feedback stability.

The current sourcing branch, as shown in FIGS. 4A and 4B, is shown implemented different from that of FIG. 3, in that the output stage of amplifier 110, which included 64× transistors 112 and 114 in FIG. 3, is shown in FIG. 4A made-up of a 16× pair of transistors 190 and 196, a 32× pair of transistors 210 and 208, and another 16× pair of transistors 214 and 220. Together, the 16×, 32×, and 16× pair of aforementioned transistors can sum together for a size total of 64×, or can be employed in various combinations so as to achieve a desired current sourcing to amplifier transistor ratio and therefore the proper attenuation of input current $I_A$.

More particularly, the first 16× pair of transistors includes P-channel transistor 190 which has the source coupled to rail voltage $V_{DD}$ and a gate coupled to gate voltage VGPA, and an N-channel transistor 196 having the source coupled to ground and the gate coupled to gate voltage VGNA. The drain terminals of transistors 190 and 196 are commonly tied together and to input pad INA to provided feedback to input current $I_A$.

The 32× pair of transistors is made-up of P-channel transistor 210 having the source tied to rail voltage $V_{DD}$ and the gate coupled to switch 200 and transistor 198, and an N-channel transistor 208 having the source tied to ground and the gate controllably coupled to gate voltage VGNA via switch-configured transistors 204 and 206. The drain terminals of transistors 210 and 208 are tied together and to the input pad INA to provide feedback to input current $I_A$. Switch 200 in combination with P-channel transistor 198 controls the application of the gate voltage VGPA to the gate of transistor 210. Similarly, transistors 204 and 206 control the application of gate voltage VGNA to the gate of transistor 208. In effect, gate voltages VGPA and VGNA are applied in response to an activated switch control signal SW6. Also included is an inverter 202 for inverting the switch control signal SW6 as applied to switch 200 and transistor 198.

The second 16× pair of transistors includes P-channel transistor 214 having the source coupled to rail voltage VDD and the gate coupled to switch 212 and transistor 211 for controllably receiving gate voltage VGPA, and an N-channel transistor 220 having the source coupled to ground and the gate coupled to transistors 216 and 218 for controllably receiving gate voltage VGNA. The drain terminals of transistors 214 and 220 are tied together and further connected to input pad INA for providing feedback to input current $I_A$. Transistor 211 and switch 212 control application of gate voltage VGPA to the gate of transistor 214 via inverter 213 from switch control signal SW5. Similarly, transistors 216 and 218 control application of gate voltage VGNA to the gate of transistor 220 in response to switch control signal SW5.

With particular reference to FIG. 4B, the current sourcing branches include selectable 1×, 2×, 4×, 8× current sourcing branches, and a fixed 1× current sourcing branch, of which the activated transistors are summed to provide a current sourcing portion of the transistor ratio. The selectable 1× current sourcing branch includes 1× P-channel transistor 228 with the source tied to rail voltage $V_{DD}$ and its gate connected to switch 224 and transistor 222 for controllably receiving gate voltage VGPA. The 1× current sourcing branch also includes a 1× N-channel transistor 234 having the source tied to ground and the gate coupled to transistors 230 and 232 for controllably receiving gate voltage VGNA. When an active signal is applied to switch control signal SW1, switch 224 and transistor 222 allow gate voltage VGPA to be applied to the gate of the transistor 228. The switch control signal SW1 is inverted by way of inverter 226 and applied to transistors 230 and 232 to allow gate voltage VGNA to be applied to the gate of transistor 234.

The 2× current sourcing branch is made-up of 2× P-channel transistor 242 having the source tied to rail voltage $V_{DD}$ and the gate coupled to switch 238 and transistor 236 for controllably receiving gate voltage VGPA. The 2× current sourcing branch also includes 2× N-channel transistor 248 having its source tied to ground and the gate coupled to transistors 244 and 246 for controllably receiving gate voltage VGNA. With a high signal applied to switch control signal SW2, switch 238 and transistor 236 allow gate voltage VGPA to be applied to the gate of transistor 242. Similarly, inverter 240 inverts switch control signal SW2, and transistors 244 and 246 allow the gate voltage VGNA to be applied to the gate of transistor 248. This allows the 2× current sourcing branch to provide a current contribution to output current $I_{OUT\ A}$.

The 4× current sourcing branch is made-up of 4× P-channel transistor 256 having the source coupled to rail voltage $V_{DD}$ and the gate coupled to switch 252 and transistor 250 for controllably receiving gate voltage VGPA. The 4× current sourcing branch further includes 4× N-channel transistor 262 having the source coupled to ground and the gate coupled to transistors 258 and 260 for controllably receiving gate voltage VGNA. A high signal applied to switch control signal SW3 allows switch 252 and transistor 250 to apply gate voltage VGPA to the gate of transistor 256. Similarly, inverter 254 inverts the switch control signal SW3 and allows transistors 258 and 260 to apply gate voltage VGNA to the gate of transistor 262. This allows the 4× current sourcing branch to provide a current contribution to the output current $I_{OUT\ A}$.

The 8× current sourcing branch has an 8× P-channel transistor 270 with the source tied to rail voltage $V_{DD}$ and the gate connected to switch 266 and transistor 264 for controllably receiving gate voltage VGPA. The 8× current sourcing branch likewise includes an 8× N-channel transistor 276 having the source tied to ground and the gate coupled to transistors 272 and 274 for controllably receiving gate voltage VGNA. With a high signal applied to switch control signal SW4, transistor 264 and switch 266 allow gate voltage VGPA to be applied to the gate of transistor 270. Inverter 268 inverts the switch control signal SW4 and allows transistors 272 and 274 to apply the gate voltage VGNA to the gate of transistor 276. This allows the 8× current sourcing branch to provide a current contribution to output current $I_{OUT\ A}$.

The fixed 1× current sourcing branch made-up of P-channel and N-channel transistors 280 and 278, respectively, is always activated to ensure there is always current sourcing provided by the current sourcing branches. The 1× P-channel transistor 280 has its source coupled to rail voltage $V_{DD}$ and its gate tied to gate voltage VGPA. The 1× N-channel transistor 278 has its source tied to ground and its gate tied to gate voltage VGNA. The drain terminals of transistors 278 and 280 are tied together and further coupled to the output line to provide a current contribution to output current $I_{OUT\ A}$.

An additional pair of 1× transistors made-up of 1× P-channel transistor 282 and 1× N-channel transistor 284 provide the polarity signal SW+ output.

Accordingly, the positive side of variable attenuator circuit 24 provides variable current attenuation to attenuate the positive input current $I_A$ and provide an attenuated as the output current $I_{OUT\ A}$. It should be realized that the negative side of variable attenuation circuit 24 is substantially similar to the positive side shown in FIGS. 4A and 4B, and provides variable current attenuation of the negative input current $I_B$ as the output current $I_{OUT\ B}$. The variable current attenuation is realized to provide a differential current, which when converted to single-ended voltage $V_{OUT}$, is within a workable signal range.

The current attenuation realized in the present invention is equal to the output current $I_{OUT\ A}$ divided by the input current $I_A$ which is determined in response to the ratio of the summation of the transistor pairs that are switched on in FIG. 4B divided by the summation of the transistor pairs that are switched on in FIG. 4A. The current attenuation ratio can be represented by the following equation:

$$\frac{I_{OUTA}}{I_A} = \frac{B_0 \cdot 8X + B_1 \cdot 4X + B_2 \cdot 2X + B_3 \cdot 1X + 1X}{A_0 \cdot 32X + A_1 \cdot 16X + 16X}$$

Wherein $B_0$–$B_3$ represent high signals on respective switch control lines SW4–SW1 to switch in the corresponding 8×, 4×, 2×, and 1× pairs of transistors. Binary signals $A_0$ and $A_1$ represent the respective binary switch control signals SW6 and SW5 for controlling the 32× and 16× pairs of transistors shown in FIG. 4A. To achieve full attenuation, binary signals $B_0$–$B_3$ are set equal to zero and binary switches $A_0$ and $A_1$ are set equal to one to provide a current attenuation ratio of 1:64. To achieve no attenuation, binary signals $B_0$–$B_3$ are set equal to one and binary signals $A_0$ and $A_1$ are set equal to zero to provide for a current attenuation ratio of one. It should be appreciated that switch control signals SW1–SW6 may be selected in various combinations to provide variable attenuation as needed. It should also be appreciated that a ratio greater than one can be achieve to provide amplification, without departing from the spirit of the present invention.

The variable attenuation circuit 24 of the present invention provides current attenuation by sequentially switching out the current sourcing branches made-up of transistors in the current attenuation circuit, or by increasing the amplifier transistors so as to reduce the size ratio of current sourcing transistors to the amplifier transistors. The advantage to reducing the amplifier transistors is to minimize quiescent current in the amplifier under normal operation. The circuit area is significantly reduced because the current sourcing circuit contains no resistors, and the transistors can be scaled to maintain the device voltage in the saturation region. The transistors employed herein are relatively small and preferably square, which is optimal for matching and area considerations. Accordingly, the current mode variable attenuation circuit 24 provides enhanced matching, reduced transistor area, and simplified external circuitry.

By employing the variable attenuation in a current mode and the RC filter network 400, the sensor interface input circuit provides for a frequency dependent attenuation curve. The RC filter network 400 provides an increased dynamic range capable of handling various sensors having different sensitivities, without requiring separate interfacing input circuitry. As a consequence, the sensor and associated processing circuitry is less susceptible to high frequency noise.

Rectifier and Differential to Single-Ended Conversion Circuit

Referring to FIG. 5, a rectifier and differential-to-single-ended conversion circuit 32 is illustrated for converting the variably attenuated current signals $I_{OUT\,A}$ and $I_{OUT\,B}$ to a single-ended voltage output $V_{OUT}$. Conversion circuit 32 includes a first switch (SW1) 304 controlled by zero cross output signal CLKB and a second switch (SW2) 306 controlled by zero cross output signal CLK. Zero cross signal CLKB is the negative of signal CLK. Switch 304 is coupled to an input for receiving the positive current $I_{OUT\,A}$, while switch 306 is coupled to an input for receiving the negative current $I_{OUT\,B}$. The output of switches 304 and 306 are commonly tied to an inverting (−) input of amplifier 308. Similarly, conversion circuit 32 further includes switch (SW3) 316 which is controlled in response to zero cross output signal CLKB, and switch (SW4) 318 which is controlled in response to zero cross output signal CLK. Switch 316 is coupled to the input for receiving the negative current $I_{OUT\,B}$, while switch 318 is coupled to the input for receiving the positive current $I_{OUT\,A}$. Switches 316 and 318 are commonly tied to the inverting (−) input of amplifier 320.

The amplifiers 308 and 320 provide rectification as explained herein. Both amplifiers 308 and 320 have a non-inverting input (+) tied to a voltage reference $V_{REF}$ which may be equal to $V_{DD}/2$ volts, which according to one example is equal to 2.5 volts. Amplifier 320 amplifies either the positive current $I_{OUT\,A}$ or the negative current $I_{OUT\,B}$ as selected via switches 316 and 318 to provide a full-wave rectification voltage V at one-half gain at node 322. Node 322 is tied back to the inverting input (−) of amplifier 320 via resistor 314 and is further tied to the inverting input (−) of amplifier 308 via resistor 312.

Amplifier 308 sums the voltage provided at its non-inverting input (+) and provides, in effect, a full-wave rectification output voltage $V_{OUT}$ at its output node 78. In addition, output node 78 is tied back to the inverting input (−) of amplifier 308 via resistor 302. Further, the inverted input (−) of amplifier 308 is tied to rail voltage $V_{DD}$ via resistor 300.

In operation, the conversion circuit 32 receives the positive and negative variably attenuated current signals $I_{OUT\,A}$ and $I_{OUT\,B}$, which are applied to amplifiers 308 and 320, depending upon the amplitude relative to each other. More particularly, currents $I_{OUT\,A}$ and $I_{OUT\,B}$ are controllably selected in response to the zero cross output signals CLK and CLKB. Zero cross output signals CLK and CLKB are determined by a comparison of the polarity signals SW+ and SW−, which provide polarity information about the input signal. In effect, polarity signals SW+ and SW− are applied to the positive and negative terminals of a comparator, and the CLK output of the comparator is high when the polarity signal SW+signal is greater in voltage than the negative polarity signal SW−. The zero cross output signal CLKB is the negative of signal CLK.

The negative current signal $I_{OUT\,B}$ is applied through switch 306 to the negative terminal of amplifier 308 when zero cross output signal CLK is high. When signal CLK is high, the negative current $I_{OUT\,B}$ is negative, and the voltage output $V_{OUT}$ is headed in the positive direction. In effect, the gain of the signal is equal to the negative current $I_{OUT\,B}$ multiplied by resistor 302. When zero cross output signal CLKB is high, the positive current $I_{OUT\,A}$ signal is applied to the negative terminal of amplifier 308. This causes the output voltage $V_{OUT}$ to head in the positive direction, thereby creating a rectifier. The inverse condition occurs at the negative terminal of amplifier 320, thereby creating a negative rectifier at the output. The gain of the signal is equal to the negative current $I_{OUT\,B}$ multiplied by resistor 314. The output of amplifier 320 is applied through resistor 312 to the negative terminal of amplifier 308. This sums the first and second stage signals to create the desired full-wave rectified voltage signal $V_{OUT}$ at output node 78. An additional resistor 300 is tied between the rail voltage $V_{DD}$ and the negative terminal of amplifier 308 to force the nominal DC reference of the output to ground. Resistors 300 and 302 are preferably equal and nominally equal to an input resistor of one hundred Kilohms (100 KΩ). Resistors 312 and 314 are preferably equal and nominally equal to one-half the input resistor. This minimizes the voltage swing on amplifier 320 and the area devoted to resistance. The gain is the same overall. The first stage provides a gain of the positive current $I_{OUT\,A}$ or the negative current $I_{OUT\,B}$ multiplied by resistor 314 times the second stage gain of the ratio of resistor 302 to resistor 312. Because resistor 314 equals resistor 312, the gain is equal to the positive or negative currents $I_{OUT\,A}$ or $I_{OUT\,B}$ multiplied by resistor 302, which is the same as the second stage of gain alone.

Because currents $I_{OUT\,A}$ and $I_{OUT\,B}$ are proportional to external currents, the gain of the circuit equals (internal resistors)/(external resistors).

External resistors are accurately controlled and exhibit little temperature variation. Internal resistors are well matched to each other but exhibit larger variations in absolute value due to process variations and a substantial temperature coefficient. Thus, the gain of the current to voltage converter varies proportional to the internal resistors.

In both amplifiers 308 and 320, the positive terminal is referenced to $V_{DD}/2$ volts. This forces the DC voltage corresponding to the positive current $I_{OUT\,A}$ and negative current $I_{OUT\,B}$ to be maintained at $V_{DD}/2$ volts, and thereby optimizes the matching of the current steering circuitry in the variable attenuator circuit 24, as previously discussed.

The rectified voltages V and $V_{OUT}$ output from respective amplifiers 320 and 308 are illustrated in FIGS. 6A and 6B, according to one example. The voltage V in FIG. 6A is full-wave rectification of currents $I_{OUT\,A}$ and $I_{OUT\,B}$ converted to voltage at one-half gain and referenced to $V_{DD}/2$ volts. The voltage $V_{OUT}$ shown in FIG. 6B is full-wave rectification of the currents $I_{OUT\,A}$ and $I_{OUT\,B}$ converted to voltage at full gain and referenced to ground. The rectified output voltage $V_{OUT}$ is then output on line 78 to the adaptive threshold circuit 36 and processed as discussed herein.

Initial Threshold Circuit

The initial threshold circuit 410 monitors the voltage output $V_{OUT}$ at output 78 of the rectifier and differential to single-ended conversion circuit 32 and determines an initial threshold voltage to be applied to comparators in the adaptive threshold circuit 36 when no attenuation is present. The initial threshold circuit 410 provides a 0 to 5 volt signal to the digital processor 94. The digital processor 94 uses an algorithm to determine the transition of the pulse train 54 from 0 to 5 volts. The algorithm employed is described in the signal flow graph of FIG. 9. It should be appreciated that the initial threshold voltage is applied when a sensor is initially connected to the interface module 25 is initially energized and no attenuation is present. The initial threshold circuit 410 accurately detects a low level voltage input and inhibits the output pulse train below a specified level which reduces the effect of noise during very low signal input levels.

Figure 7:
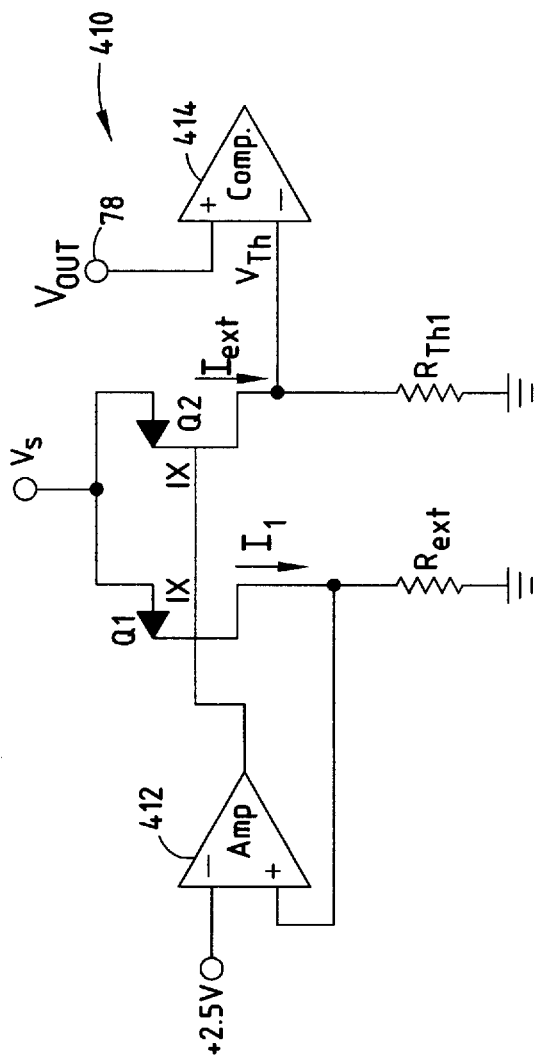
FIG. 7 is a circuit diagram illustrating the initial threshold circuit according to the present invention.

The initial threshold circuit 410 is used to vary the voltage threshold of the low amplitude signal as a function of on-chip resistors to compensate for variations in circuit gain due to temperature and process variations that affect the integrated circuit resistors. Referring to FIG. 7, the initial threshold circuit 410 is shown connected to a differential to single-ended amplifier 412 having an inverting input connected to a voltage potential of +2.5 volts. The initial threshold circuit 410 includes a current mirror made-up of first and second transistors Q1 and Q2 each having a gate connected to the output of differential amplifier 412, and a voltage input connected to a voltage supply $V_S$. The initial threshold circuit 410 is shown including an external resistor $R_{ext}$ and an internal resistor $R_{Th1}$. The drain of first transistor Q1 provides a current $I_1$ through external resistor $R_{ext}$. The drain of second transistor Q2 provides a current $I_{ext}$ through resistor $R_{Th1}$. The current mirror maintains current $I_1$ equal to current $I_{ext}$. According to one example, voltage $V_S$ is set at 5 volts to generate current $I_{ext}$ and $I_1$, equal to 2.5 volts divided by $R_{ext}$. In addition, a comparator 414 compares the voltage $V_{Th}$ at the drain of transistor Q2 to the rectifier output $V_{OUT}$ at output 78.

The gain of the sensor input to the rectifier output $V_{OUT}$ varies as a function of the integrated circuit resistor values, including the resistance of resistors 302, 312, and 314 (see FIG. 5). As the integrated circuit resistors increase in value, the signal gain increases and, thus, a small signal from the sensor will trip the initial threshold circuit 410 which may not be desirable because the signal-to-noise ratio of the sensor may be too low to properly process the signal input under such conditions. As the integrated circuit resistors decrease in value, the signal gain decreases and, thus, a larger signal from the sensor is required to trip the initial threshold circuit 410. The internal resistor $R_{Th1}$ is formed on the same ASIC as the integrated circuit resistors 302, 312, and 314, and thus resistor $R_{Th1}$ varies in resistance proportional to temperature and process induced variations of the integrated circuit resistors. External resistor $R_{ext}$ is formed external to the ASIC. By allowing the voltage threshold $V_{Th}$ of the initial threshold circuit 410 to change as a function of the resistors, the variation in gain is compensated. When the resistors $R_{ext}$ and $R_{Th1}$ are small, the signal gain is low, however, the threshold of the low amplitude detection circuit is also low and the sensor input signal level required to trip the circuit remains constant. As the resistor $R_{Th1}$ increases in amplitude, the gain changes and also the corresponding threshold changes which allows for the input signal amplitude to remain constant regardless of the integrated circuit resistor values.

As described above, the output currents $I_1$ and $I_{ext}$ generated by the current mirrors are set each to one another. According to one example, the integrator circuit resistor $R_{Th1}$ is nominally equal to one hundred Kilohms (100 KΩ), and external resistor $R_{ext}$ is set equal to one hundred Kilohms (100 KΩ). As the integrated circuit resistors vary, the amplitude of the rectifier output signal $V_{OUT}$ will change, as will the threshold voltage $V_{Th}$. Thus, the input amplitude at which the initial threshold transitions will not change.

Figure 8:
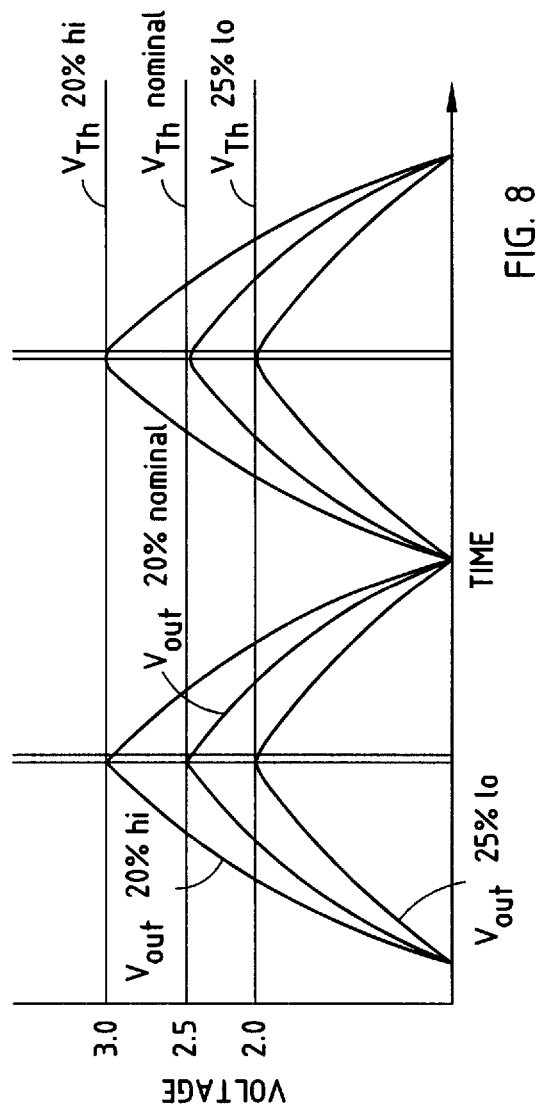
FIG. 8 is a graph illustrating the rectifier output and threshold signals for a constant input signal for varying resistance due to temperature and process variations.

Referring to FIG. 8, the rectifier outputs and threshold signals for a constant input signal with the integrated circuit resistors varying at plus twenty percent (+20%) and minus twenty-five percent (−25%) is shown. As can be seen, the rectifier output voltage $V_{OUT}$ and the threshold voltage $V_{Th}$ vary proportionally and the initial threshold trips at the same point regardless of the amplitude of the internal resistor $R_{Th1}$. Thus, the initial threshold circuit 410 is independent of variations in resistance of the integrated circuit resistors due to process and temperature variations.

Figure 9:
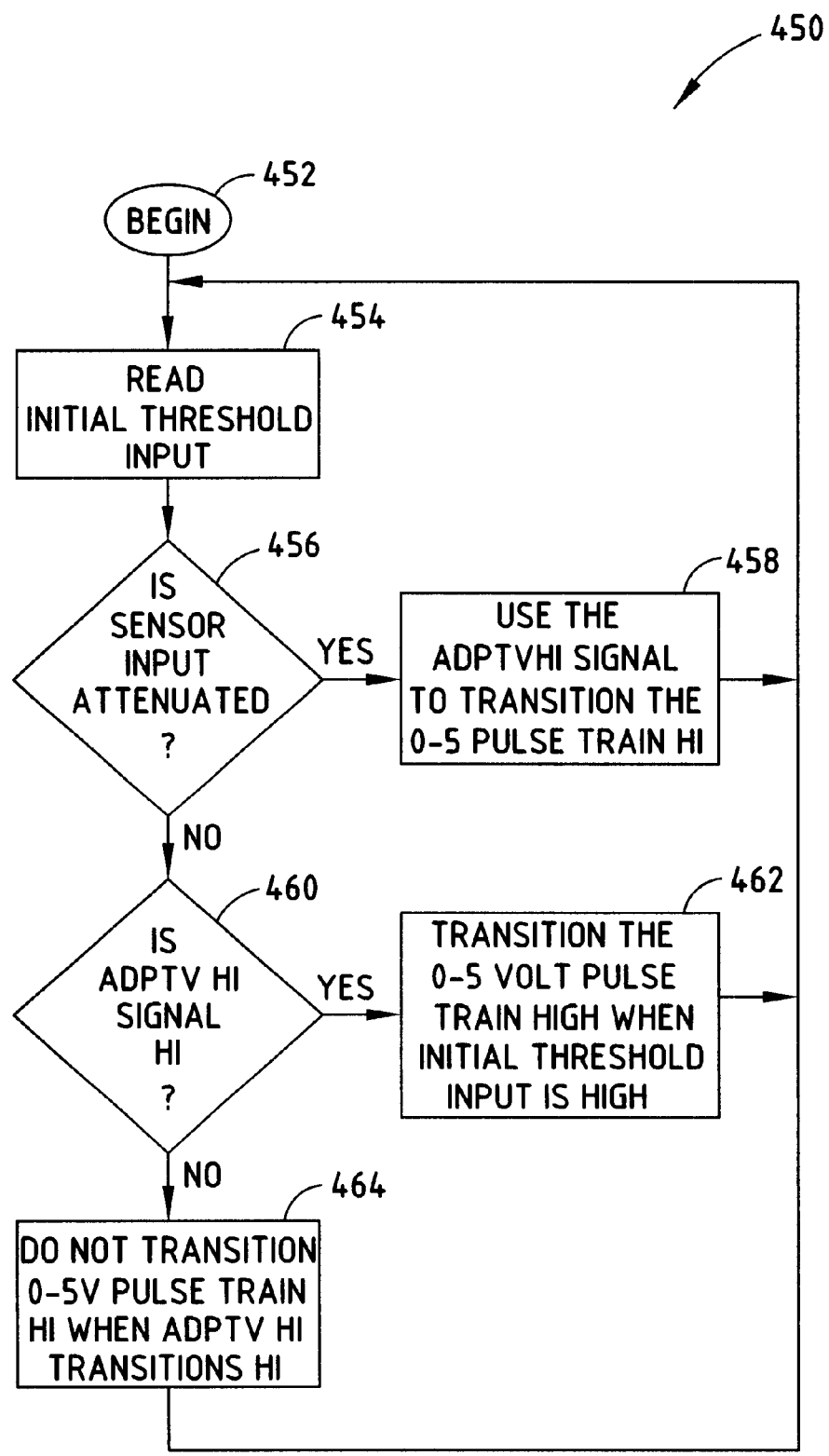
FIG. 9 is a flow diagram illustrating a routine for implementing the initial threshold circuit.

Referring to FIG. 9, a routine 450 is illustrated for controlling application of the initial threshold voltage according to one embodiment. Routine 450 begins at step 452 and proceeds to read the initial threshold voltage input in step 454. In decision step 456, routine 450 determines whether the sensor input is attenuated. If the sensor input is attenuated, routine 450 proceeds to step 458 to use the adaptive high (ADPTVHI) signal to transition the 0 to 5 pulse train high, before returning to step 454. If the sensor input is not attenuated, decision step 460 determines if the adaptive high ADPTVHI signal is high and, if so, transitions the 0 to 5 volt pulse train high when the initial threshold input is high before returning to step 454. Otherwise, if the adaptive high signal is not high, routine 450 does not transition the 0 to 5 pulse train high when the adaptive high transition is high as provided in step 464, before returning to step 454.

Accordingly, the initial threshold circuit 410 is initially applied to low amplitude sensor signals when attenuation is not provided. The digital processor 94 may determine when the initial threshold circuit can be applied. It should be appreciated that by applying an initial threshold voltage as described herein, the sensor module 25 is more adaptive to employ a wider variety of sensors having various sensitivities, without requiring further modification to the sensor interface input circuitry.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

What is claimed is:

1. A variable attenuation circuit for adaptively attenuating an alternating differential voltage produced from a magnetic sensor in response to rotation of a wheel, comprising:

an input circuit for receiving an input alternating differential voltage from a magnetic sensor via first and second input lines, said input circuit including an RC filter coupled to said first and second input lines for attenuating high frequency signals;

a voltage to current converter circuit for converting the input alternating differential voltage to a differential current signal, wherein the voltage to current converter circuit has an input coupled to the input circuit, and the input has a constant input impedance;

variable attenuation circuitry for selectively attenuating said differential current signal;

a current to voltage converter circuit for converting the attenuated differential current to a voltage signal;

a comparator for comparing the voltage signal to a threshold:

an initial threshold circuit for setting an initial threshold for a comparison by the comparator, wherein the initial threshold circuit generates an initial threshold that varies proportional to internal resistance of the current to voltage converter circuit;

a controller for controlling when the initial threshold voltage will be applied as an input to the comparator; and an output for providing the output voltage within a preferred voltage range.

2. The variable attenuation circuit as defined in claim 1, wherein said variable attenuation circuitry comprises:

a first current sourcing circuit coupled to said first input line for sourcing current to maintain a fixed voltage at said first input line and providing a first current, said first current sourcing circuit including a first plurality of selectable current sourcing branches for attenuating the first current;

a second current sourcing circuit coupled to said second input line for sourcing current to maintain a fixed voltage at said second input line and providing a second current, said second current sourcing circuit including a second plurality of selectable current sourcing branches for attenuating said second current; and switching circuitry for controlling selection of pairs of said first and second plurality of current sourcing branches so as to provide selectable amounts of current sourcing to attenuate said first and second currents.

3. The variable attenuation circuit defined in claim 1, wherein said RC filter comprises a first pair of resistors coupled to the first input line, a second pair of resistors coupled to the second input line, and a capacitor coupled between said first and second input lines.

4. The variable attenuation circuit as defined in claim 1 further comprising a differential to single-ended converter for converting said differential output current to a single-ended voltage.

5. A variable attenuation circuit for adaptively attenuating an alternating differential voltage produced from a magnetic sensor in response to rotation of a wheel, comprising:

an input circuit for receiving an input alternating differential voltage from a magnetic sensor via first and second input lines;

a voltage to current converter circuit for converting the input alternating differential voltage to a differential current signal;

variable attenuation circuitry for selectively attenuating said differential current signal;

a current to voltage converter circuit for converting the attenuated differential current to a voltage signal, said current to voltage converter circuit having an internal resistance;

a comparator for comparing the voltage signal to a threshold; and an initial threshold circuit for generating an initial threshold voltage for comparison by the comparator, wherein the initial threshold circuit generates an initial threshold voltage that varies proportional to internal resistance of the current to voltage converter circuit.

6. The variable attenuation circuit as defined in claim 5 further comprising a controller for controlling when the initial threshold voltage is applied as an input to the comparator.

7. The variable attenuation circuit as defined in claim 5, wherein the initial threshold circuit includes a resistor formed on an integrated circuit, said resistor having a resistance which varies proportional to an internal resistance variation in the current to voltage converter circuit.

8. The variable attenuation circuit as defined in claim 5, wherein the initial threshold circuit has a gain which varies based on variation of the internal resistance so as to compensate for at least one of temperature and process variations.

9. The variable attenuation circuit as defined in claim 5, wherein the input circuit comprises an RC filter coupled to the first and second input lines for attenuating high frequency signals.

10. A method for variably attenuating an alternating differential voltage produced from a magnetic sensor in response to rotation of a wheel, said method comprising the steps of:

receiving an alternating differential voltage from a magnetic sensor via first and second input lines;

converting the input alternating differential voltage to a differential current signal;

selectively attenuating the differential current signal;

converting the attenuated differential current signal to a voltage signal with a current to voltage converter circuit having an internal resistance;

comparing the voltage signal to a threshold voltage; and setting a threshold voltage to an initial threshold voltage for the comparison, wherein the initial threshold voltage varies proportional to internal resistance of the current to voltage converter circuit.

11. The method as defined in claim 10 further comprising the step of controlling when the initial threshold voltage will be applied as an input to the comparator.

12. The method as defined in claim 10 further comprising the step of converting the differential current to a voltage output.

* * * * *